(12) United States Patent
Mori et al.

(10) Patent No.: US 7,469,243 B2
(45) Date of Patent: Dec. 23, 2008

(54) METHOD AND DEVICE FOR SEARCHING FIXED LENGTH DATA

(75) Inventors: Masaya Mori, Kawasaki (JP); Shinpei Watanabe, Yokohama (JP); Yoshihisa Takatsu, Yamato (JP); Toshio Sunaga, Ohtsu (JP)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 10/707,943

(22) Filed: Jan. 27, 2004

(65) Prior Publication Data

US 2004/0205056 A1    Oct. 14, 2004

(30) Foreign Application Priority Data

Jan. 27, 2003    (JP)    ............... 2003-016979

(51) Int. Cl.
*G06F 7/00*    (2006.01)
*G06F 12/00*    (2006.01)
*G06F 15/16*    (2006.01)

(52) U.S. Cl. ............... 707/3; 707/10; 707/200; 711/216; 711/220; 709/236; 709/245

(58) Field of Classification Search ............... 707/1–10, 707/100–102, 104.1, 200–201; 711/220–221, 711/215–216; 713/187–189; 709/245, 231, 709/236; 370/352, 389, 392, 395, 400, 474

See application file for complete search history.

(56) References Cited

U.S. PATENT DOCUMENTS

| | | | | |
|---|---|---|---|---|
| 5,757,795 A | * | 5/1998 | Schnell ................. | 370/392 |
| 5,914,938 A | * | 6/1999 | Brady et al. ........... | 370/254 |
| 5,920,900 A | * | 7/1999 | Poole et al. ............ | 711/216 |
| 6,084,877 A | * | 7/2000 | Egbert et al. .......... | 370/389 |
| 6,111,874 A | * | 8/2000 | Kerstein ................ | 370/389 |
| 6,230,231 B1 | * | 5/2001 | DeLong et al. ......... | 711/3 |
| 6,266,705 B1 | * | 7/2001 | Ullum et al. ........... | 709/238 |
| 6,292,483 B1 | * | 9/2001 | Kerstein ................ | 370/389 |
| 6,424,650 B1 | * | 7/2002 | Yang et al. ............. | 370/390 |
| 6,434,662 B1 | * | 8/2002 | Greene et al. .......... | 711/108 |

(Continued)

FOREIGN PATENT DOCUMENTS

JP    03-245233    10/1991

(Continued)

*Primary Examiner*—Miranda Le
(74) *Attorney, Agent, or Firm*—Cantor Colburn LLP; Lisa Jaklitsch

(57) ABSTRACT

Embodiments of the present invention provide method and device for searching fixed length data. The device includes a hash operation means for operating and outputting a hash value of inputted fixed length data, a data table memory consisting of N numbers of memory banks, where N is an integer that is more than and equal to 2, the data table memory for storing a data table holding a large number of fixed length data, a pointer table memory for storing a memory pointer table holding a memory address at which each fixed length datum is stored with the hash value as an index, and a comparison means for simultaneously comparing a plurality of fixed length data stored at the same memory address in the N numbers of memory banks with a single fixed length datum inputted to the hash operation means, the comparison means for outputting results of the comparison.

13 Claims, 13 Drawing Sheets

U.S. PATENT DOCUMENTS

| | | | |
|---|---|---|---|
| 6,633,865 B1 * | 10/2003 | Liao | 707/3 |
| 6,665,297 B1 * | 12/2003 | Hariguchi et al. | 370/392 |
| 6,697,380 B1 * | 2/2004 | Egbert et al. | 370/469 |
| 6,697,873 B1 * | 2/2004 | Yik et al. | 709/238 |
| 6,728,261 B1 * | 4/2004 | Sasson et al. | 370/466 |
| 6,731,633 B1 * | 5/2004 | Sohor et al. | 370/392 |
| 6,735,670 B1 * | 5/2004 | Bronstein et al. | 711/108 |
| 6,775,281 B1 * | 8/2004 | Brown | 370/392 |
| 6,785,278 B1 * | 8/2004 | Calvignac et al. | 370/392 |
| 6,862,602 B2 * | 3/2005 | Guha | 707/101 |
| 6,910,118 B2 * | 6/2005 | Kagawa | 711/216 |
| 6,922,410 B1 * | 7/2005 | O'Connell | 370/401 |
| 6,950,434 B1 * | 9/2005 | Viswanath et al. | 370/392 |
| 2002/0138648 A1 * | 9/2002 | Liu | 709/245 |
| 2003/0026246 A1 * | 2/2003 | Huang et al. | 370/352 |
| 2003/0050762 A1 * | 3/2003 | Hatley | 702/122 |
| 2003/0061495 A1 * | 3/2003 | Minnick | 713/189 |
| 2003/0174710 A1 * | 9/2003 | Gooch | 370/395.32 |
| 2004/0044868 A1 * | 3/2004 | Guerrero | 711/164 |
| 2004/0049493 A1 * | 3/2004 | Davis | 707/3 |

FOREIGN PATENT DOCUMENTS

| | | |
|---|---|---|
| JP | 10-210066 | 8/1998 |
| JP | 2002-334114 | 11/2002 |

* cited by examiner

[Figure 1]
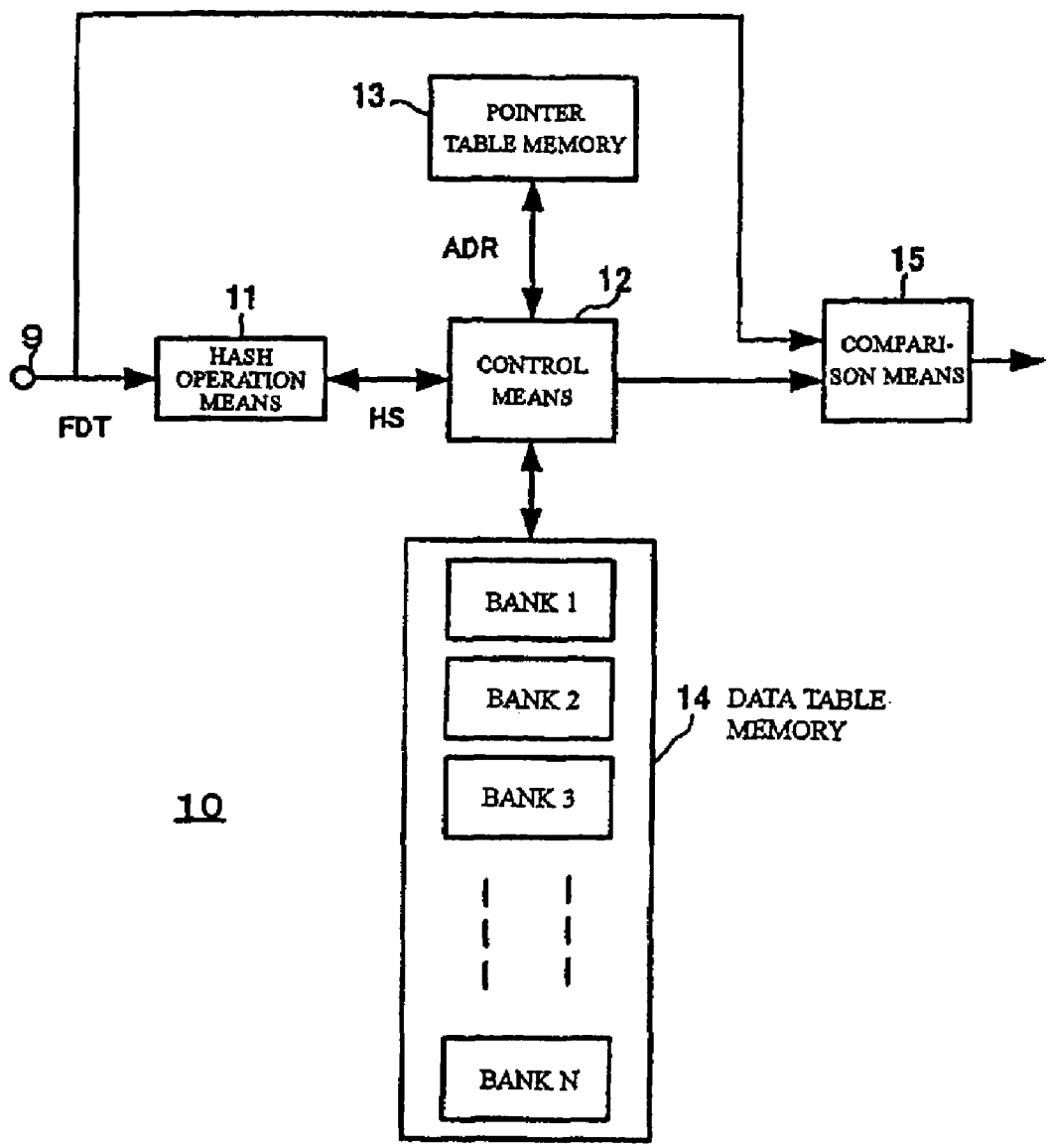

[Figure 2]
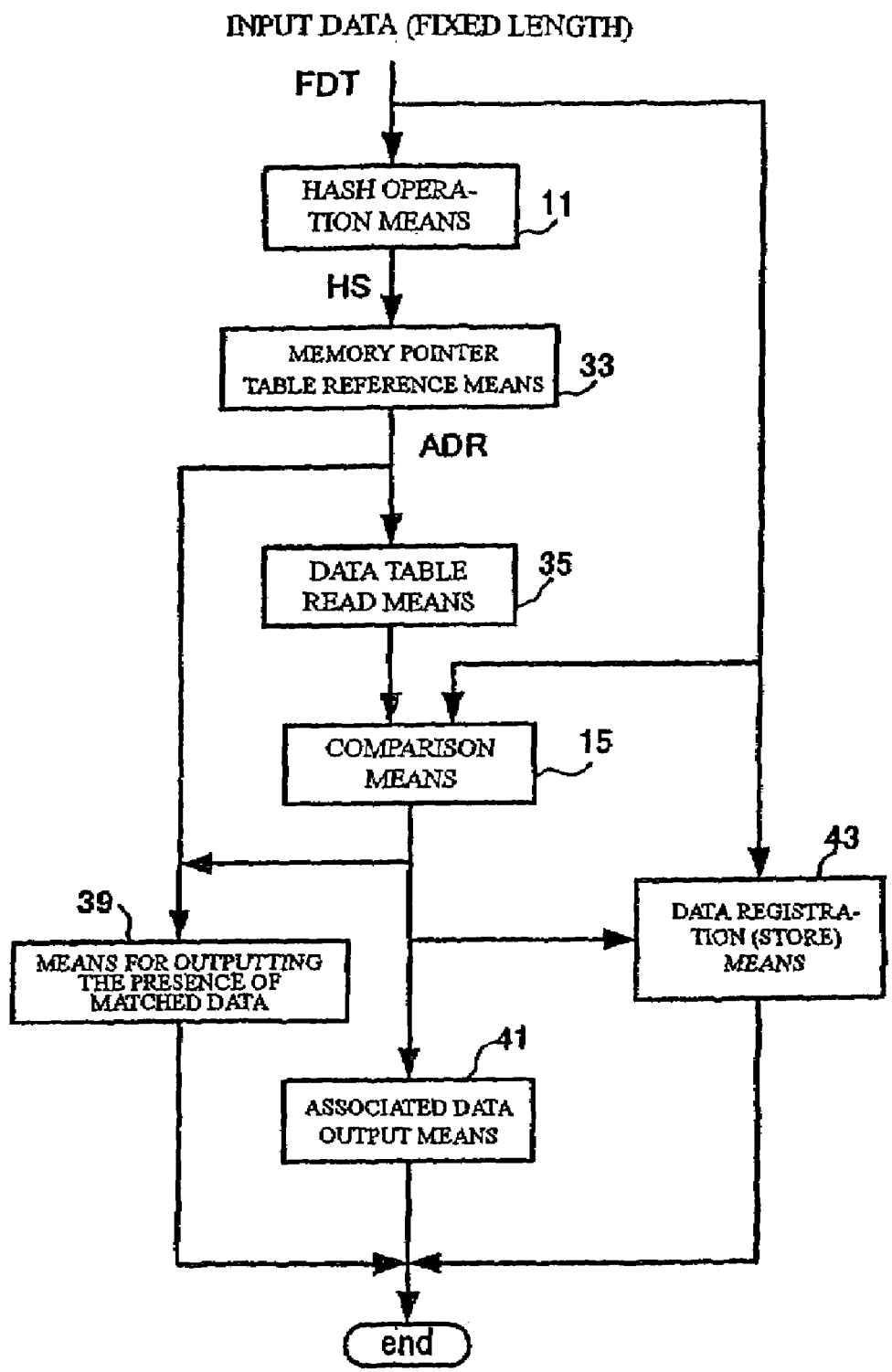

[Figure 3]
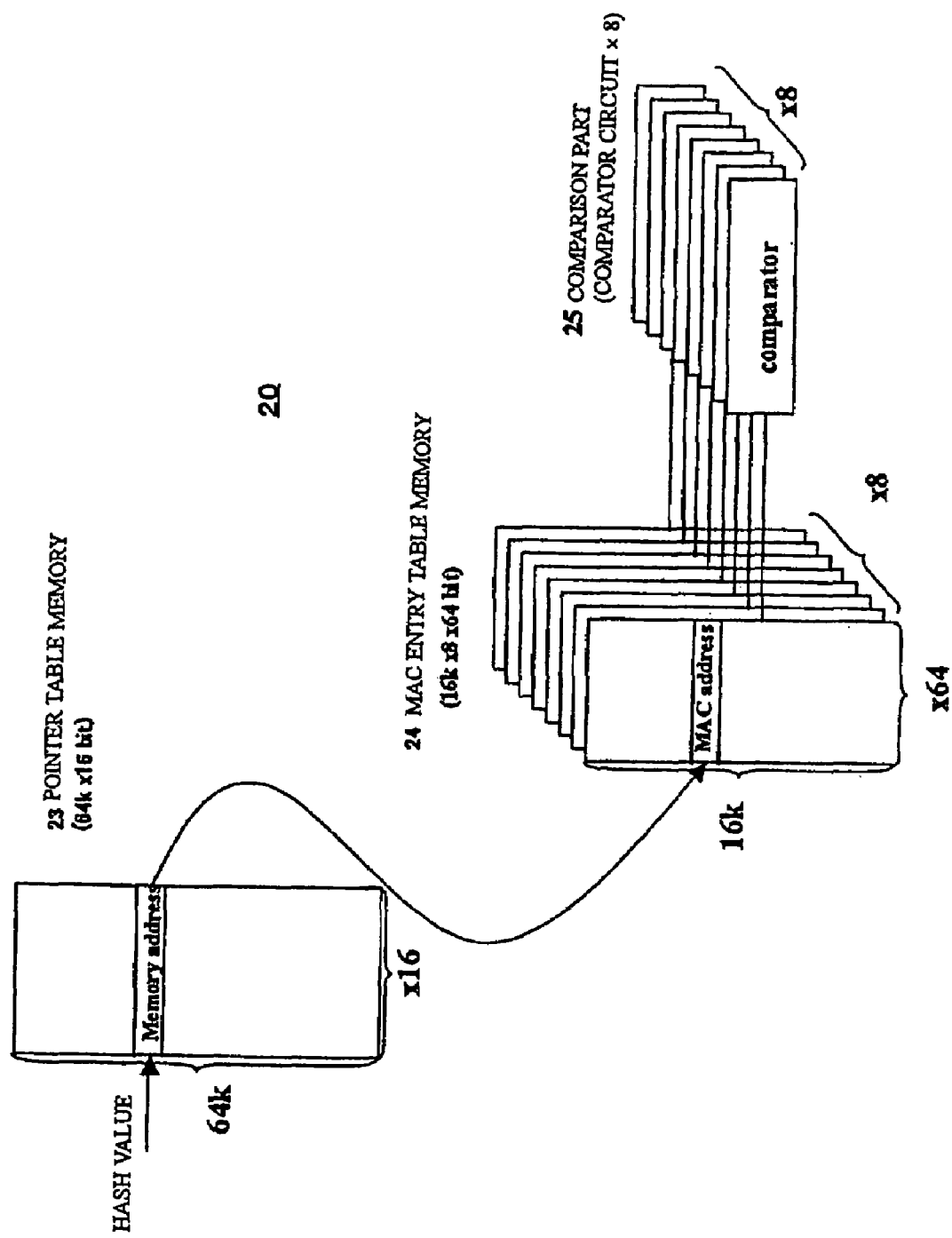

[Figure 4]
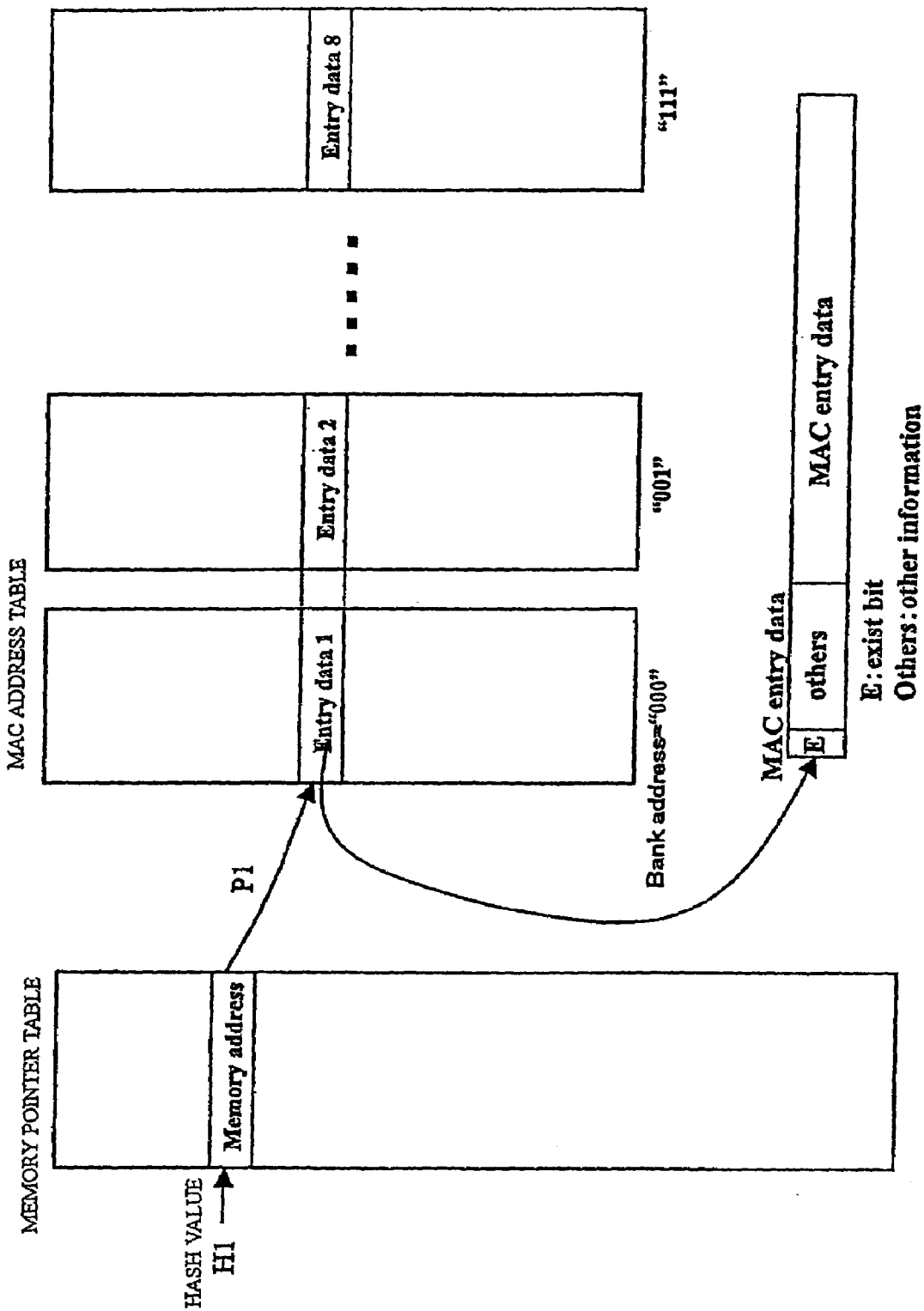

[Figure 5]
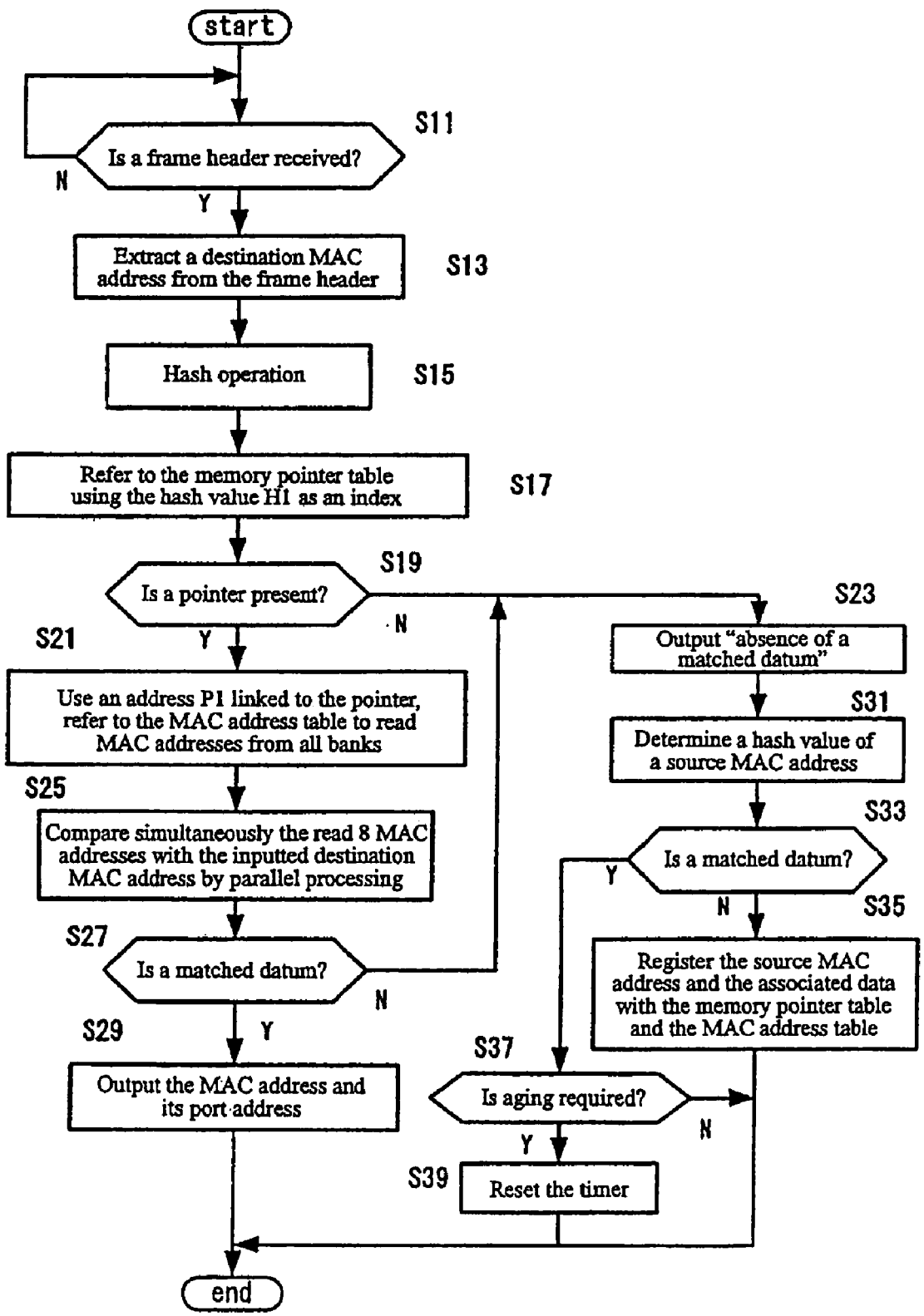

[Figure 6]
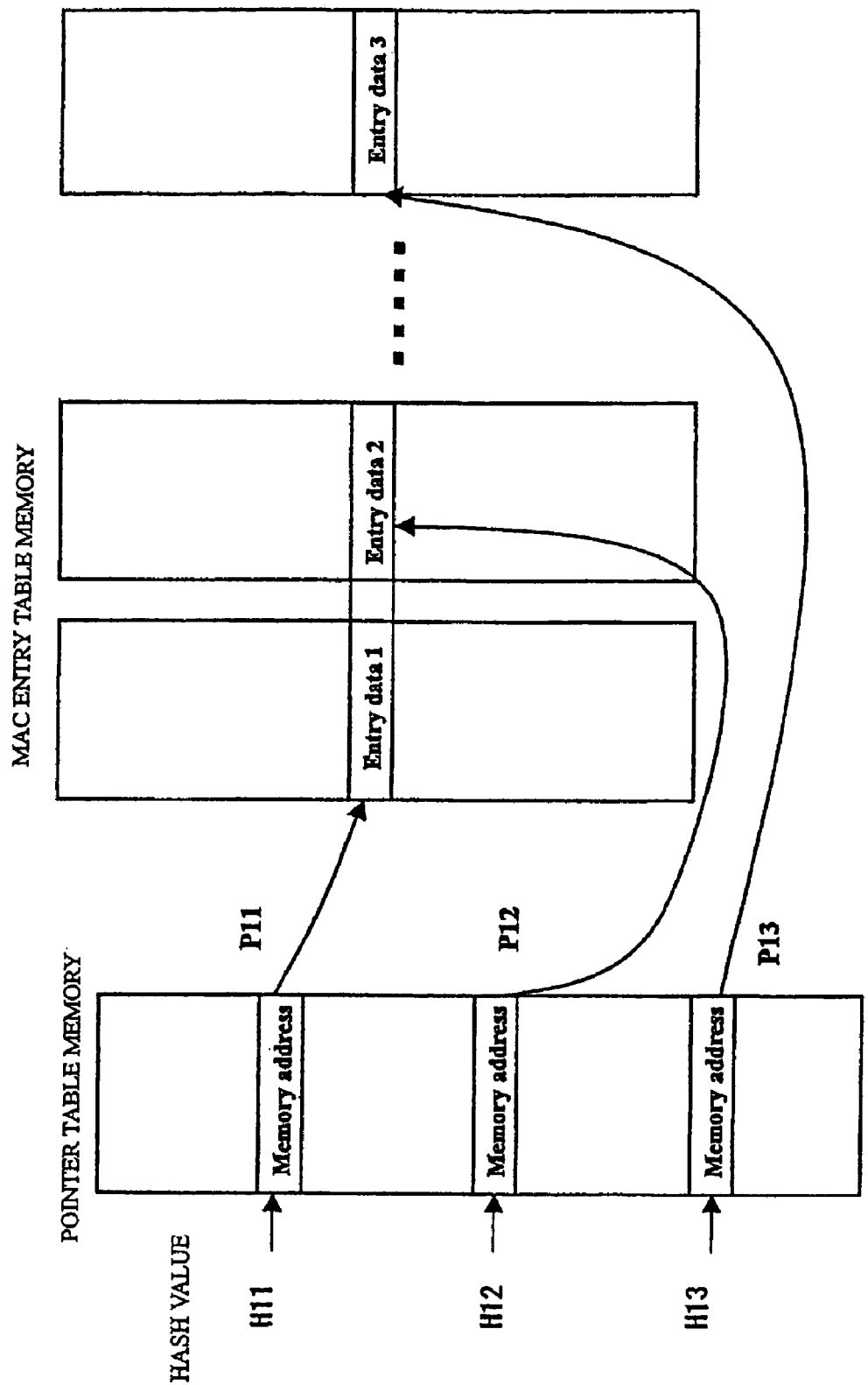

[Figure 7]
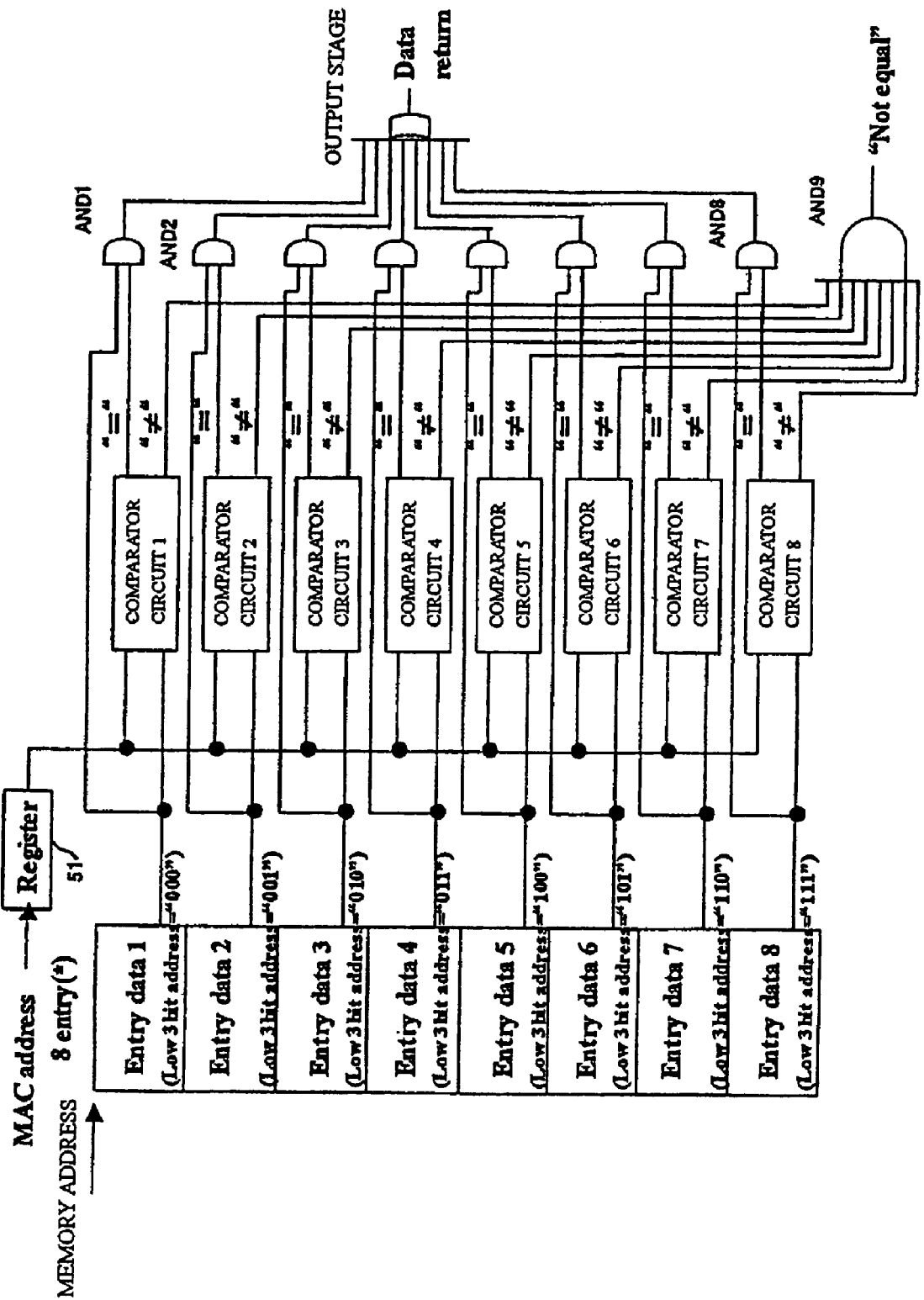

[Figure 8]
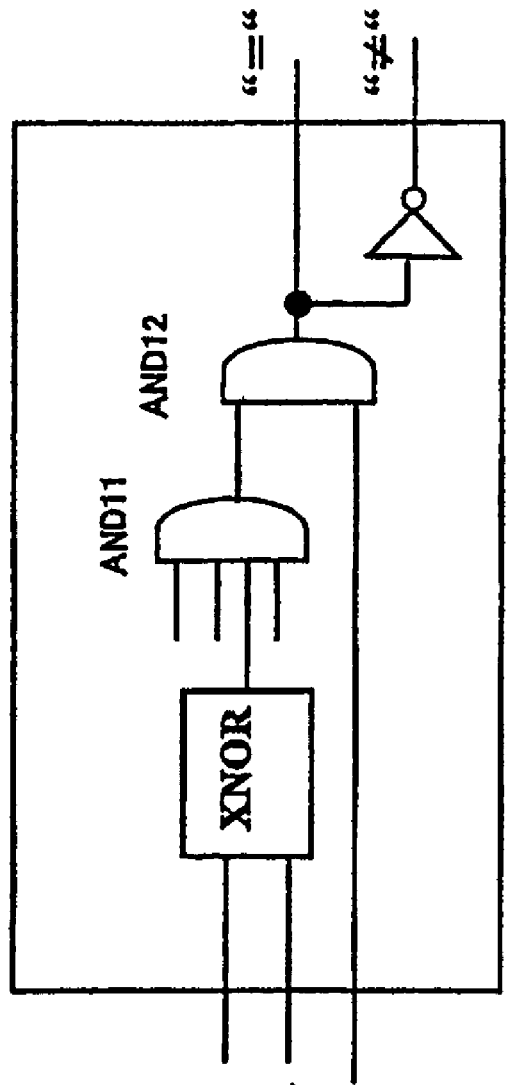

[Figure 9]
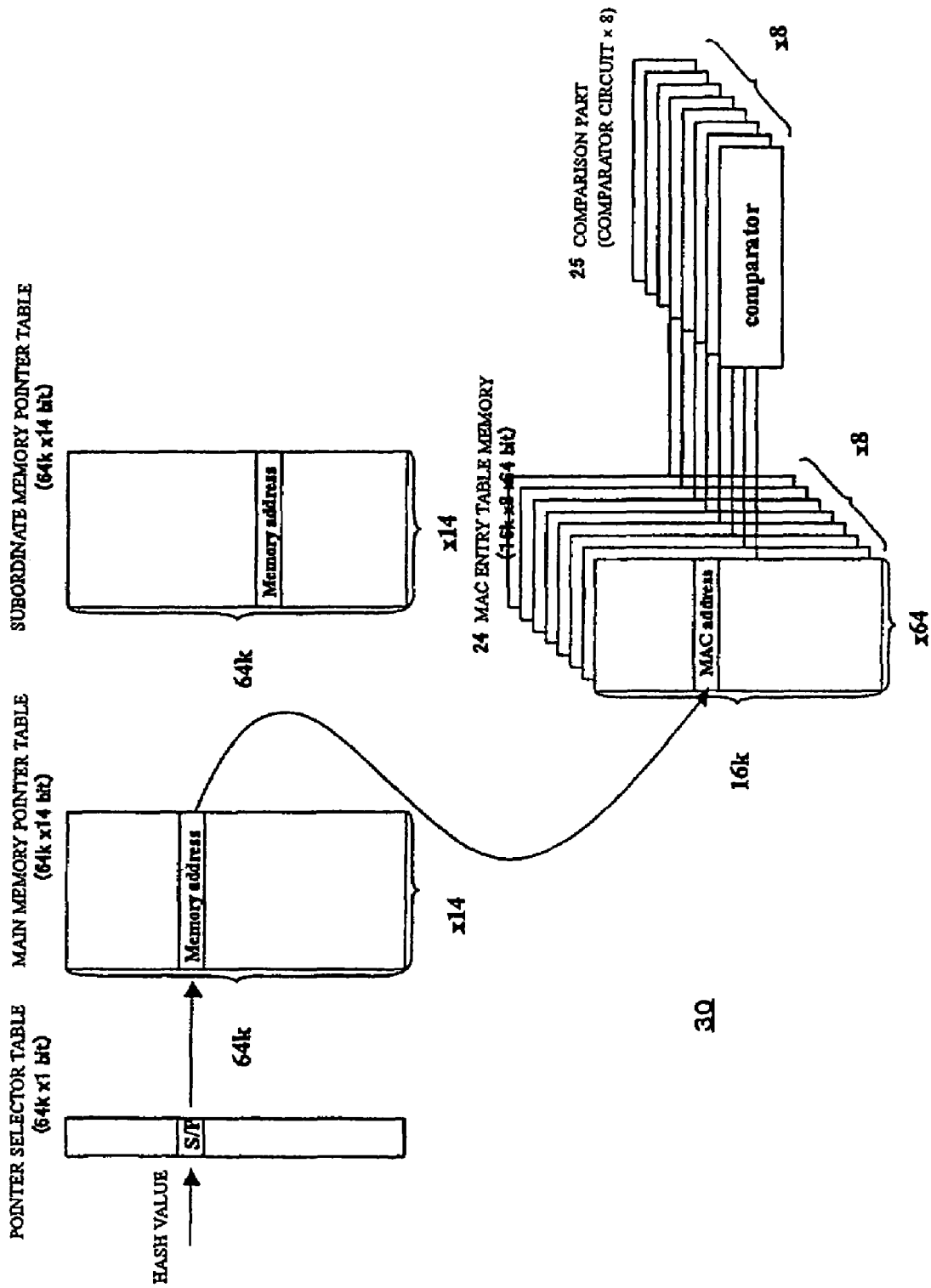

[Figure 10]
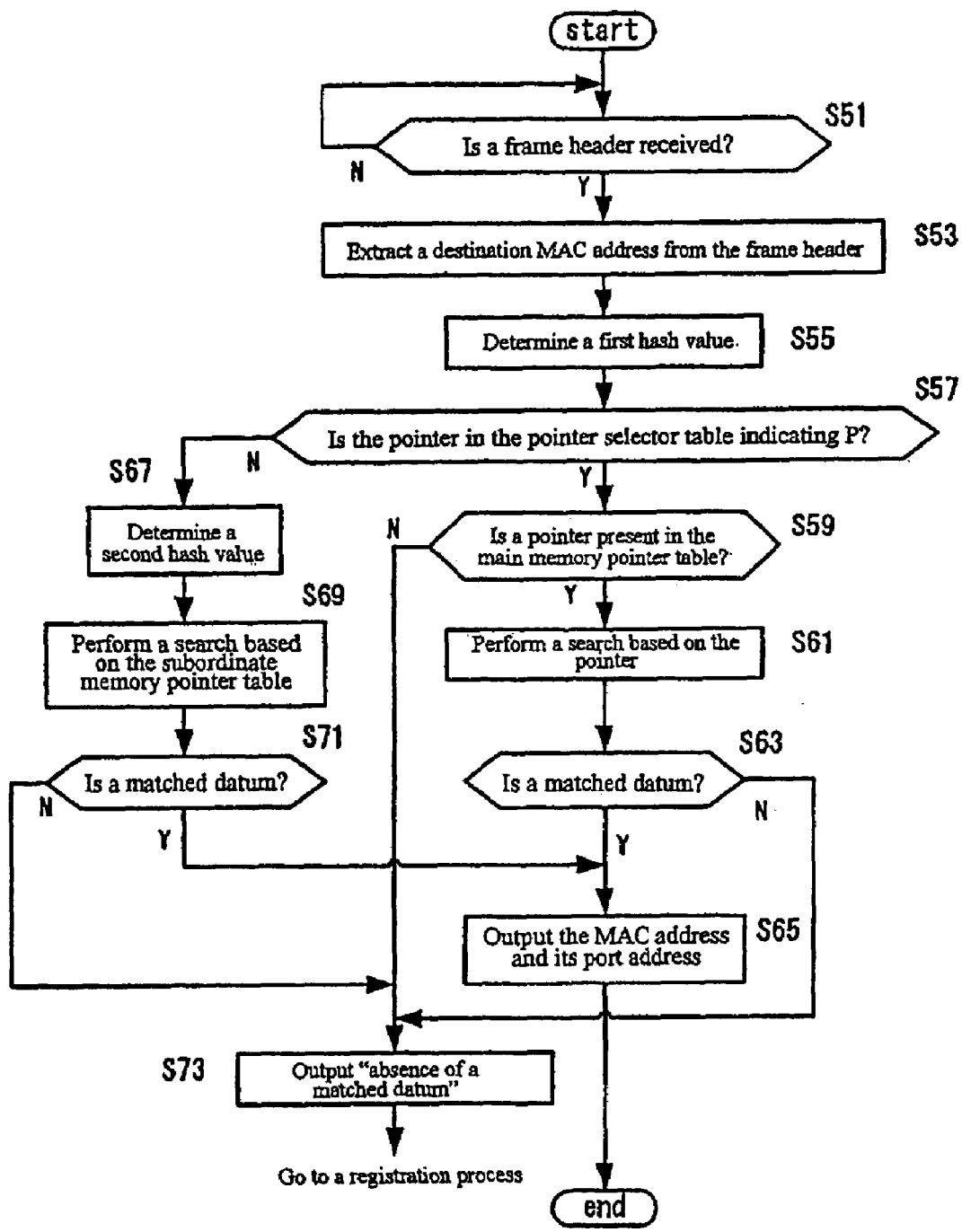

[Figure 11]

| 1 | 2 | 3 | 24 | 25 | 48 |
|---|---|---|---|---|---|
| | | VENDER IDENTIFIER | | IDENTIFIER USED WITHIN THE VENDER | |

[Figure 12]
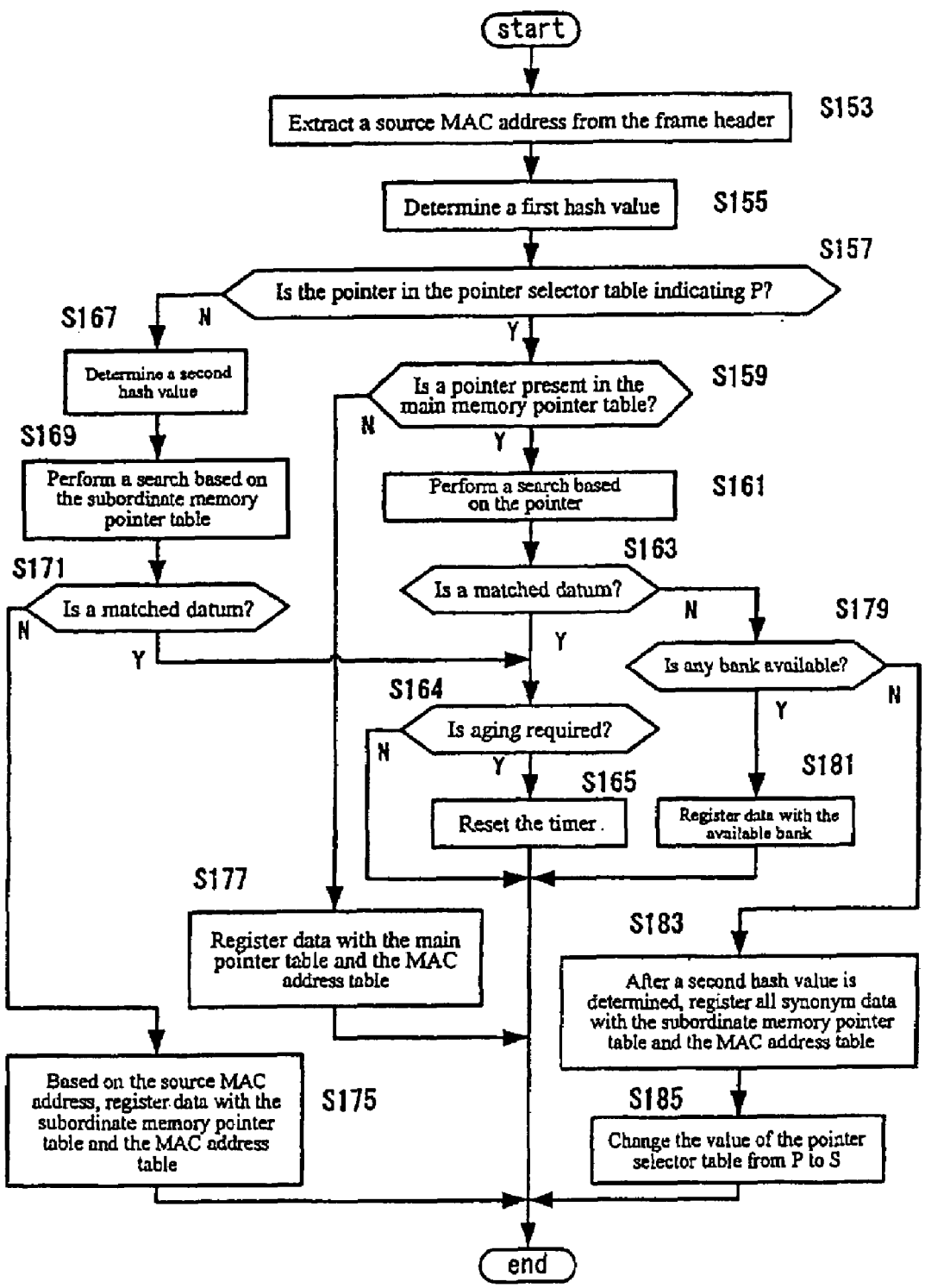

[Figure 13]
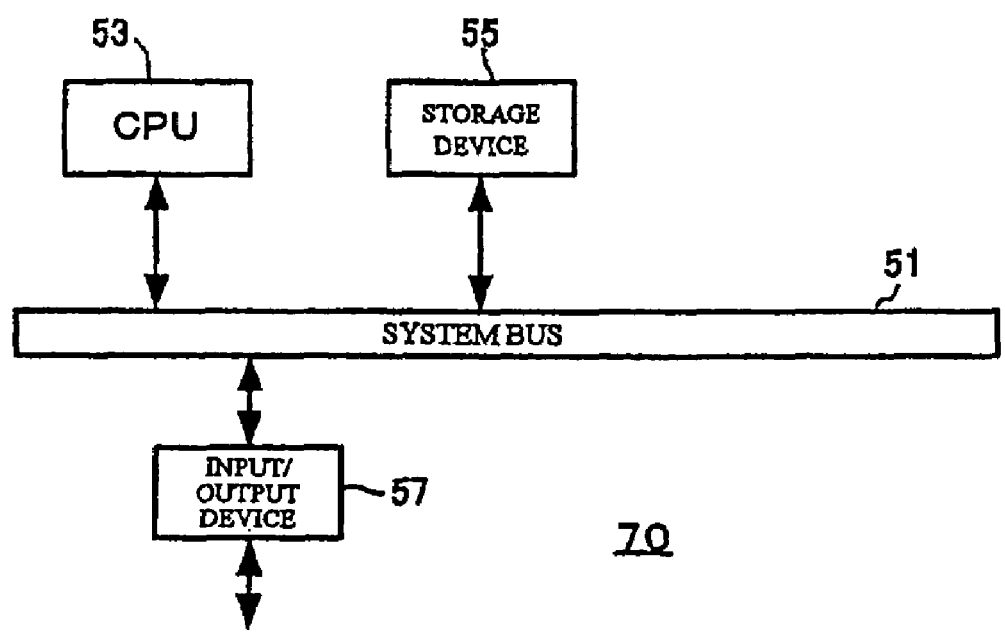

METHOD AND DEVICE FOR SEARCHING FIXED LENGTH DATA

BACKGROUND OF INVENTION

The present invention relates to a device and method for searching fixed length data that have a fixed data bit length, and a computer program as well as a computer readable recording medium, and particularly to a device and method for rapidly searching a MAC address in an inter-network relay device, and a computer program as well as a computer readable recording medium.

A database for determining a relay destination used in a conventional inter-network relay device suffers from problems that, because multiple search keys are converted to the same hash value, it requires a long period of time to reconstruct a MAC table, or requires a long period of time to search data required in a MAC address table, compromising an efficient search even with hash functions. To solve these problems, it has been proposed, for example, to use a different table when learning from one when determining an actual relay destination, and provide memory pointers for both of the above hash tables for each entry of a MAC address for example as shown below.

Published Unexamined patent application No. 10-210066Among traditional network switches used for inter-network relay devices, such as L2 (the second layer of the Open System Interconnection (OSI) reference model) switch, L3 (the third layer of the OSI reference model) switch and the like, systems capable of supporting more than tens of thousands of MAC addresses can support a large number of servers and clients. They must, however, search all MAC addresses held in a MAC entry table memory to locate a port corresponding to a MAC address before they can identify the port associated with the MAC address. This would be a significant cause for reducing the performance of a switch for a large network switch means that has more than tens of thousands of MAC addresses.

FIG. 11 shows a structure of a MAC address. A MAC address is used to identify a node connected to a data link, and is specified by IEEE802.3. A MAC address consists of a fixed length datum of 48 bits, and the 3 to 24 bit section of the datum indicates a vender identifier and the 25 to 48 bit section indicates an identifier used within the vender. The vender identifier is an address formally called as an Organizationally Unique Identifier, or OUI, and managed by the IEEE for each vender so that the identifiers will never overlap with each other. The identifier used within the vender is an address managed by the vender for each product so that the identifiers will never overlap with each other.

A destination MAC address that indicates a destination and a source MAC address that indicates a source are attached to the transmitted frames and packets, and are transmitted therewith. A switch means such as L2 switch, L3 switch, and router has a MAC entry table memory to identify a destination port for the frames or packets. The MAC entry table memory is a memory for storing a MAC address table, which is a list showing an association of a MAC address with the corresponding port etc. and retains information on a large number of MAC addresses.

The MAC address table is created based on the source MAC address information separated from the header in a received frame. When the MAC address table is used to search a MAC address, a destination MAC address separated from the header in the received frame is used for this purpose.

To rapidly search any MAC address from more than a hundred thousands of MAC address table memories in a switch means, it is a common practice (1) to provide a cache memory that can temporally retain MAC addresses, and if the received MAC address has already been in the cache memory, the corresponding port address is retrieved from the cache memory and the data are transferred only to the port, and (2) if the destination MAC of interest has not yet retained in the above cache memory, the data need to be transferred to all ports except the source port by so-called broadcasting.

In the case of the above (1), it is difficult to store more than a hundred thousands of MAC addresses in a cache memory of a practical size, and when a switch means handles communications exceeding the amount that the cache can accommodate, more frequent broadcasts as described above (2) may occur.

Broadcasting increases the load on the associated networks because it is processed so that packets are simultaneously placed onto every associated network. As a result, broadcasting may cause all networks to fall into a state as if they are temporally stopped, leading to the decreased throughput of the associated switch means.

An example using a cache as described above (1) uses Content Addressable Memory, or CAM. Although using CAM enables to rapidly search a MAC address (also referred to as a fast search hereinafter), CAM does not allow for the manufacturing of a CAM because of its construction and cannot store a MAC address table with more than tens of thousands of entries.

There may be some possible search methods when general memories are used to rapidly search a MAC address (a fast search) without using CAM. For example, (3) when more than a hundred thousands of MAC addresses are sorted in a way adapted to the search method, the quick search using a binary search, for example, can be used to search a MAC address within 18 times of memory accesses if the number of entries of MAC addresses is 128k.

To use such an algorithm, however, the MAC address table must always be arranged to facilitate a search operation. Some network hosts such as mobile products, however, will not always make a connection at the same place. The correlation between some MAC addresses and port addresses of some switches/routers, therefore, may continuously vary over time and may repetitively be added and removed. Data in the MAC entry table memory, therefore, must regularly be rearranged in response to the addition and removal of data in the MAC entry table memory. The rearrangement requires a long period of time, typically between few milliseconds and several ten milliseconds, for entries more than a hundred thousands, and this substantially makes it impractical to use general memories for searching a MAC address.

To efficiently store inconsecutive data such as MAC addresses, the following processes are involved: it is a common practice (4) to associate a hash value generated by a hash function with a memory address in a memory pointer table so that entry data such as MAC addresses can be substantially dispersed by the hash method, correlating only one entry datum with each memory address in the MAC address table.

It is, however, impossible to uniformly disperse memory addresses of all entry data because of inexistence of a perfect hash function. If different MAC addresses, or entry data for a function, coincide with each other in their hash values, multiple data are correlated with the same memory address in a MAC entry table memory storing a MAC address table. This requires a process of selecting one of the aforementioned multiple data during a search operation, and also requires that store addresses should be changed in response to the addition and removal of data in constructing the MAC entry table, presenting problems that data should be rearranged, or an amount of memory several times larger than that of data expected to be stored should be provided to accommodate the maximum amount of data in consideration of duplication of memory addresses.

SUMMARY OF INVENTION

The present invention has been made to solve the problems as described above, and it is a primary object of the invention to facilitate fast searching of a large number of fixed length data such as MAC addresses stored in a data table, and to provide a device or method or computer recording medium therefore.

In accordance with the above listed and other objects we provide, a fixed length data search device, fixed length data search method and a computer readable recording medium according to the invention are constituted to achieve the above object as follows:

A fixed length data search device according to a first aspect of the invention comprises a hash operation means for operating and outputting a hash value of an inputted fixed length datum, a data table memory consisting of N numbers of memory banks, where N is an integer that is more than and equal to 2, the data table memory for storing a data table holding a large number of fixed length data, a pointer table memory for storing a memory pointer table holding a memory address at which each fixed length datum is stored with said hash value as an index, a comparison means for simultaneously comparing a plurality of fixed length data stored at the same memory address in said N numbers of memory banks with a single fixed length datum inputted to said hash operation means, the comparison means for outputting a result of the comparison.

A fixed length data search device according to a second aspect of the invention is a device in which, in the fixed length data search device according to the first aspect of the invention, said comparison means comprises N numbers of comparators for determining whether or not two fixed length data are identical, the device refers to said memory pointer table based on the hash value of the single fixed length datum inputted to said hash operation means, and refers to said data table based on a resulting memory address, said comparison means determines whether or not any of the fixed length data stored at the same memory address in said N numbers of memory banks matches with the single fixed length datum inputted to said hash operation means and outputs the result of the determination.

A fixed length data search device according to a third aspect of the invention is a device in which, in the fixed length data search device according to the first or second aspect of the invention, an identical datum to the single fixed length datum inputted to said hash operation means is searched in said data table through said hash operation means, and said single fixed length datum is registered with said data table if the datum has not been registered with said data table.

A fixed length data search device according to a forth aspect of the invention is a device in which, in the fixed length data search device according to the third aspect of the invention, each of separate fixed length data having the same hash value is stored at the same memory address of a different memory bank in said data table memory.

A fixed length data search device according to a fifth aspect of the invention is a device in which, in the fixed length data search device according to the third aspect of the invention, each of a plurality of fixed length data having a different hash value is stored at the same memory address of a different memory bank in said data table memory.

A fixed length data search device according to a sixth aspect of the invention is a device in which, in the fixed length data search device according to any one of the first to the fifth aspect of the inventions, said fixed length data is a MAC (Media Access Control) address for network communications, and said data table memory is a MAC entry table memory for storing a MAC address table holding a large number of MAC addresses.

A fixed length data search device according to a seventh aspect of the invention comprises a hash operation means for using two types of hash functions to determine a first and second hash values of an inputted fixed length datum, a data table memory consisting of N numbers of memory banks, where N is an integer that is more than and equal to 2, the data table memory for storing a data table holding a large number of fixed length data, a pointer table memory for storing a main memory pointer table holding a memory address at which each fixed length datum is stored with said first hash value as an index, and a subordinate memory pointer table holding the memory address at which each fixed length datum is stored with said second hash value as an index, and a comparison means for simultaneously comparing a plurality of fixed length data stored at the same memory address in said N numbers of memory banks with a single fixed length datum inputted to said hash operation means, the comparison means for outputting a result of the comparison.

A fixed length data search device according to an eighth aspect of the invention is a device which, in the fixed length data search device according to the seventh aspect of the invention, comprises a pointer selector table using said first hash value as an index to indicate which one of said two memory pointer tables should be referred to when a fixed length datum is inputted.

A fixed length data search device according to a ninth aspect of the invention is a device in which, in the fixed length data search device according to the eighth aspect of the invention, when the number of stored data of fixed length data having the same first hash value exceeds N, a pointer in said pointer selector table corresponding to the first hash value of a fixed length datum to be newly stored is set to said subordinate memory pointer table, and a plurality of fixed length data that have the same second hash value and that are different from each other are dispersed and each stored at the same address of a different memory bank in said data memory, said memory address at which the datum is stored is managed with said subordinate memory pointer table.

A fixed length data search device according to a tenth aspect of the invention is a device in which, in the fixed length data search device according to the ninth aspect of the invention, said comparison means comprises N numbers of comparators, said comparators simultaneously compare all bits to determine whether or not two fixed length data are identical.

A fixed length data search device according to a 11th aspect of the invention is a device which, in the fixed length data search device according to the ninth aspect of the invention, refers to said pointer selector table based on the first hash value of the single fixed length datum inputted to said hash operation means, refers to said main memory pointer table or subordinate memory pointer table according to the pointer in said table, and refers to said data table based on a resulting memory address, said comparison means determines whether or not any of the fixed length data stored at the same memory address in said N numbers of memory banks matches with the single fixed length datum inputted to said hash operation means and outputs the result of the determination.

A fixed length data search device according to a 12th aspect of the invention is a device in which, in the fixed length data search device according to the ninth aspect of the invention, another fixed length datum having the same first hash value as an inputted fixed length datum has not been registered with said data table, said inputted fixed length datum is stored in said data table memory, and said memory address at which the datum is stored is managed with said main memory pointer table.

A fixed length data search device according to a 13th aspect of the invention is a device in which, in the fixed length data search device according to any one of the seventh to the 12th aspect of the inventions, said fixed length data is a MAC (Media Access Control) address for network communications, and said data table memory is a MAC entry table memory for storing a MAC address table holding a large number of MAC addresses.

A 14th aspect of the invention is a computer program causing a computer to function as an information processing device according to any one of the first to 13th aspect of the inventions.

A 15th aspect of the invention is a computer readable recording medium, on which a computer program according to the 14th aspect of the invention is recorded.

A method of searching fixed length data according to a 16th aspect of the invention comprises the steps of performing hash operation to operate and output a hash value of an inputted fixed length datum, referring, based on said operated hash value, to a memory pointer table holding a memory address at which each fixed length datum is stored with said hash value as an index, reading N numbers of fixed length data stored at an address pointed by a pointer in said memory pointer table from a data table stored in a data table memory consisting of N numbers of memory banks, where N is an integer that is more than and equal to 2, the data table holding a large number of fixed length data, and simultaneously comparing said read N numbers of fixed length data with said inputted single fixed length datum, and outputting a result of the comparison.

A method of searching fixed length data according to a 17th aspect of the invention is a method in which, in the method of searching fixed length data according to the 16th aspect of the invention, in said step of comparing, comparing processes determining whether or not two fixed length data are identical are simultaneously performed for said read N numbers of fixed length data by parallel processing.

A method of searching fixed length data according to a 18th aspect of the invention is a method which, in the method of searching fixed length data according to the 16th or 17th aspect of the inventions, comprises the steps of searching an identical datum to said inputted single fixed length datum in said data table based on its hash value, and registering said inputted single fixed length datum with said data table if said identical datum has not been detected in said step of searching.

A method of searching fixed length data according to a 19th aspect of the invention is a method in which, in the method of searching fixed length data according to the 18th aspect of the invention, in said step of registering, each of separate fixed length data having the same hash value is registered with the same memory address of a different memory bank in said data table memory.

A method of searching fixed length data according to a 20th aspect of the invention is a method in which, in the method of searching fixed length data according to the 18th aspect of the invention, in said step of registering, each of a plurality of fixed length data having a different hash value is registered with the same memory address of a different memory bank in said data table memory.

A method of searching fixed length data according to a 21st aspect of the invention is a method in which, in the method of searching fixed length data according to any one of the 16th to 20th aspect of the inventions, said fixed length data is a MAC Access Control) address for network communications, and said data table memory is a MAC entry table memory for storing a MAC address table holding a large number of MAC addresses.

A method of searching fixed length data according to a 22nd aspect of the invention comprises the steps of performing a first hash operation to determine a first hash value of an inputted fixed length datum using a first hash function, performing a second hash operation to determine a second hash value of an inputted fixed length datum using a second hash function, referring, based on said first hash value, to a main memory pointer table holding a memory address at which each fixed length datum is stored with said first hash value as an index, referring, based on said second hash value, to a subordinate memory pointer table holding a memory address at which each fixed length datum is stored with said second hash value as an index, reading N numbers of fixed length data stored at an address indicated by a pointer in said main memory pointer table or said subordinate memory pointer table from a data table memory, the data table memory composed of N numbers of memory banks, where N is an integer that is more than and equal to 2, and the data table memory storing a data table holding a large number of fixed length data, and comparing said read N numbers of fixed length data with the inputted single fixed length datum.

A method of searching fixed length data according to a 23rd aspect of the invention is a method which, in the method of searching fixed length data according to the 22nd aspect of the invention, comprises the step of referring, based on said first hash value of the inputted fixed length datum, to a pointer selector table that uses said first hash value as an index to indicate which one of said two memory pointer tables should be referred to when the fixed length datum is inputted.

A method of searching fixed length data according to a 24th aspect of the invention is a method which, in the method of searching fixed length data according to the 23rd aspect of the comprises the step of, when the number of stored data of separate fixed length data having the same first hash value exceeds N in said data table, setting to said subordinate memory pointer table a pointer in said pointer selector table corresponding to the first hash value of a fixed length datum to be newly stored.

in which, in the method of searching fixed length data according to the 22nd aspect of the invention, said step of comparing comprises the step of comparing all bits of data in comparing each of read N numbers of fixed length data with the inputted fixed length datum.

A method of searching fixed length data according to a 25th aspect of the invention is a method which, in the method of searching fixed length data according to the 2nd aspect of the invention, comprises the step of dispersing a plurality of fixed length data that have the same second hash value and that are different from each other to store each thereof at the same address of a different memory bank in said data memory, and then registering said memory address at which the datum is stored with said subordinate memory pointer table.

A method of searching fixed length data according to a 26th aspect of the invention is a method which, in the method of searching fixed length data according to the 22nd aspect of the invention, comprises the step of storing an inputted fixed length datum in said data table memory if another fixed length datum having the same first hash value as said inputted fixed length datum has not been registered with said data table, and registering said memory address at which the datum is stored with said main memory pointer table, and further step of using an unused to store the inputted fixed length datum in said data table memory if any unused address exists, and if there is no unused address, storing the datum in a memory bank that does not have any datum stored among used addresses.

A method of searching fixed length data according to a 27th aspect of the invention is a method in which, in the method of searching fixed length data according to any one of the 22nd to 26th aspect of the invention, said fixed length data is a MAC (Media Access Control) address for network communications, and said data table is a MAC address table holding a large number of MAC addresses.

BRIEF DESCRIPTION OF DRAWINGS

FIG. 1 is a block diagram illustrating a first example according to the inventive fixed length data search device;

FIG. 2 is a functional block diagram of the fixed length data search device 10;

FIG. 3 is a block diagram of main parts of a MAC address search device shown as the second example of the inventive fixed length data search device;

FIG. 4 shows the case when each of multiple entry data with the same hash value is stored at the same address in multiple memory banks;

FIG. 5 is a flow chart illustrating a method for searching/registering a MAC address according to the second example of the invention;

FIG. 6 illustrates how entry data are allocated if no unused address is available in the MAC entry table memory 24;

FIG. 7 is a block diagram illustrating an example of a comparison means for simultaneously comparing 8 entries;

FIG. 8 illustrates an example of a comparator circuit in FIG. 7;

FIG. 9 is a conceptual diagram illustrating a fixed length data search device according to a third example of the invention;

FIG. 10 is a flow chart illustrating a MAC address search process according to the third example of the invention;

FIG. 11 shows a structure of a MAC address;

FIG. 12 is a flow chart illustrating a MAC address registration process according to the third example of the invention; and FIG. 13 is a block diagram illustrating an exemplary configuration of hardware applicable to a computer program and computer readable recording medium according to the invention.

DETAILED DESCRIPTION

FIG. 1 is a block diagram illustrating a first example according to the inventive fixed length data search device. The fixed length data search device 10 shown in FIG. 1 comprises a hash operation means 11 for operating and outputting a hash value of inputted fixed length data, a data table memory 14 that consists of N numbers of memory banks, where N is an integer that is more than and equal to 2, and stores the fixed length data in the form of a data table, a pointer table memory 13 for storing a memory address of each fixed length datum stored in the data table memory 14 in the form of a memory pointer table with the hash value as an index, a comparison means 15 that simultaneously compares multiple fixed length data stored at the same memory address in the N numbers of memory banks with a single fixed length datum inputted to the hash operation means 11, and outputs a result of the comparison, and a control means 12 provided with CPU to control the entire fixed length data search device. The table memory 13 and data table memory 14 may be constructed in a single memory.

FIG. 2 is a functional block diagram of the fixed length data search device 10. The operation of the fixed length data search device 10 will now be described with reference to FIG. 1 and 2.

A fixed length datum is inputted to a input terminal 9. The hash operation means 11 performs a hash function on the inputted fixed length datum, and determines a hash value HS. A pointer table reference means 33 refers to the pointer table memory 13 with the calculated hash value HS as an index, and determines whether or not a pointer exists at the corresponding address in the pointer table memory 13. Using the hash value as an index, the memory pointer table indicates an address in the data table memory 14 that stores the fixed length datum having the hash value.

When the memory pointer table is referenced and a pointer is found at the corresponding address in the pointer table memory 13, the data table read means 35 searches in the data table memory 14 based on the memory address indicated by the pointer. The data table is a table for holding a large number of fixed length data, and the data table memory 14 is a memory for storing the data table. Each fixed length datum held in the data table is associated with various information on the fixed length datum, and a large number of fixed length data are correlated with associated information and held in the data table.

The data table memory 14 consists of N numbers of memory banks, where N is an integer that is more than and equal to 2. A memory pointer ADR that is associated with the hash value determined in the hash operation means 11 may, therefore, be associated with up to N numbers of fixed length data in the data table memory 14. This means that each pointer ADR in the memory pointer table indicates one of the memory addresses in the data table memory 14, up to N numbers of fixed length data may exist corresponding to the memory address ADR at corresponding memory addresses ADR in memory banks 1 to N.

The comparison means 15 comprises N numbers of comparators for comparing two fixed length data, determines whether or not the fixed length datum FDT inputted to the input terminal 9 is registered with the data table, and then a means for outputting the presence of the matched data output 39 outputs the result of the determination. Each comparator composing the comparison means 15 compares the fixed length datum FDT inputted to the terminal 9 with a single fixed length datum read at an address ADR in a memory bank.

The data table memory 14 stores up to N numbers of fixed length data at a memory address ADR using N numbers of memory banks. If fixed length data are stored in two or more memory banks at an address ADR, comparison between fixed length data stored at an address ADR and the fixed length datum FDT inputted to the input terminal 9 is simultaneously performed for multiple data. Up to N numbers of comparators, then, synchronously perform the comparisons.

If the comparison means 15 detects a datum that coincides with the fixed length datum FDT, data associated with the datum are outputted from an associated data output means 41.

If the memory pointer table reference means 33 does not detect a pointer corresponding to the hash value HS outputted from the hash operation means 11, this means that the corresponding datum is not stored in the data table memory 14, and then the memory pointer table reference means 33 outputs a signal indicating the absence of the pointer, while the means for outputting the presence of matched data 39 outputs a signal indicating the absence of a matched datum. A data registration means, or data store means, 43 then stores the fixed length datum in the data table, and registers the memory address thereof with the memory pointer table. Processes of storing in the data table and registering with the memory pointer table performed in the data registration means 43 may be performed separately from the search process.

When a datum matched with the fixed length datum FDT inputted to the input terminal 9 is not detected by the comparison means 15 through the comparison even if a pointer corresponding to the hash value HS exists, this means that the fixed length datum FDT is not stored in the data table, and then the data registration means 43 stores the fixed length datum FDT in the data table. In this case, because this means that there are entries with the same hash address, the multiple data are stored at the same addresses ADR in different memory banks. means that additional data are stored in any of available memory banks of N numbers of memory banks at the address ADR indicated by the pointer.

As described above, even if multiple fixed length data with the same hash value should be stored in the data table, the memory pointer table do not have to be changed, and each of multiple fixed length data with the same hash value is stored at the same address in multiple memory banks in the data table memory 14 up to N numbers of data. When some fixed length data in the multiple fixed length data are removed, the memory pointer table also do not have to be changed, and rearrangement of data is not required in the data table.

When a fixed length datum is searched, the inputted fixed length datum and fixed length data read from N numbers of memory banks in the data table memory may simultaneously be compared by parallel processing to output search results in a very short time.

The second example according to the invention will now be described by taking the case when the fixed length data is a MAC address as an example.

FIG. 3 is a block diagram of main parts of a MAC address search device shown as the second example of the inventive fixed length data search device. As used herein, "collision" is used to indicate that some data have the same hash value among multiple entry data. Multiple data with the same hash value are also called as "synonym" data.

In a MAC address search device 20 shown in FIG. 3, a MAC entry table memory 24 corresponds to the data table memory 14 shown in FIG. 1. It is assumed that the MAC entry table memory that stores a MAC address table is composed of 8 memory banks, as shown in FIG. 3.

In this second example, a MAC address composed of 48 bits is entered in a hash operation means, which is not shown, and a 16-bit hash value is outputted. A pointer in a memory pointer table indicates an address of the MAC entry table memory that stores the entered MAC address.

The memory pointer table uses a hash value calculated from the inputted MAC address as an index. This means that the 16-bit data outputted as the hash value is associated with an address in the pointer table memory. The hash value is thus used as an index to indicate the memory address at which the MAC address is stored with the pointer in the memory pointer table.

According to the MAC address search device 20 of the second example, data transfer by inserting and removing entry data can be eliminated in the MAC address table. In the MAC entry table memory updates, which frequently occur by relocation of connection points, removal functions possible in any arbitrary cycle and the like, memory access counts associated with the table reconstruction can be minimized. A larger portion of accesses can, therefore, be assigned to the search operations, and more ports can be supported.

A specific example will now be described, assuming that hash functions are used, up to 8 data may be collided, up to 128k entries of MAC address data may be stored, and the hash value is 16 bits.

The fixed length data search device 20 shown in FIG. 3 includes (1) a hash operation means 21 (not shown), (2) a control means 22 (not shown), (3) a pointer table memory 23 for storing 64k' 16 bit memory pointer table, (4) a MAC entry table memory 24 for storing 16k '8' 64 bit MAC address table, and (5) a comparison means 25 consisting of 8 comparator circuits. The MAC entry table memory 24 is composed of 8 memory banks.

It should be noted that the MAC entry table memory 24 has the address depth of 16k; reduced by a factor of 4 in comparison the address depth of 64k of the pointer table memory 23.

A memory address at which a MAC address associated with the address in the pointer table memory 23 is stored is written in the memory pointer table as a pointer; one corresponding memory address in the MAC entry table memory 24 is written as a pointer, and the address at which the MAC address is stored can be found by referring to the memory pointer table using a hash value as an index.

When a MAC address is received, or a MAC address to be compared is inputted, the hash operation means 21 calculates a hash value of the MAC address. The memory pointer table is then referred to using the resulting hash value as the index. Then, based on the address in the MAC entry table memory indicated by the pointer, each of MAC addresses stored in 8 memory banks of the MAC entry table memory 24 is read. In the comparison means 25, the read 8 data are compared with the MAC address to be compared that is separately provided. The comparison means 25 comprises 8 comparators, and each comparator compares one datum read from the MAC entry table memory with the MAC address to be compared to determine whether the they are matched with each other, while 8 comparators are synchronously operated by parallel processing. The comparison means 25 outputs the results of the comparisons.

FIG. 4 shows the case when each of multiple entry data with the same hash value is stored at the same address in multiple memory banks. A MAC address is stored in the MAC entry table memory 24, while the location at which a datum is stored (memory address) is indicated by a pointer in the memory pointer table. Each MAC address written in the MAC entry table memory 24 is associated with other information than the MAC address for storage. The data structure places Exist bit of 1 bit at the start, followed by additional information (other information) and MAC address (MAC entry data), as shown in FIG. 4. The additional information includes a port number, etc.

As described above, the MAC entry table memory 24 is composed of 8 memory banks of the same size. The Exist bit of a written memory area is ON. After a predetermined time elapses, the datum in the memory area is removed and the Exist bit is set to OFF. Not all the identical addresses in 8 memory banks always store 8 data, and because a memory area with the Exist bit set to OFF is not considered to hold a datum, the datum in the memory area is not subject to the comparison in the comparison means 25.

If multiple entries with the same hash value H1 are created as a result of the hash operation on an inputted datum, these collided multiple MAC addresses (synonym data) are allocated to different memory banks at the same address in the MAC entry table memory 24 for storing them.

For example, assume that all hash values for 8 MAC addresses of Entry Data 1 to 8 are H1, as shown in FIG. 4. Assuming that the pointer in the memory pointer table is P1 in this case, the Entry Data 1 is stored at the address P1 in the memory bank with the memory bank address of "000," and the Entry Data 2 is stored at the address P1 in the memory bank with the memory bank address of "001." Similarly, the Entry Data 8 is stored at the address P1 in the memory bank with the memory bank address of "111." Eight entry data are thus stored at the same addresses in 8 memory banks.

In contrast, multiple MAC addresses that their hash values are not collided with each other are allocated to a different addresses in the MAC entry table memory 24. When a datum should be added and no address in the MAC entry table memory 24 is available, the allocation may occur as shown in FIG. 6, and FIG. 6 will be described in detail below.

FIG. 5 is a flow chart illustrating a method for searching/registering a MAC address according to the second example of the invention. The process shown in FIG. 5 is executed when an entry datum is inputted to the MAC address device 20 shown in FIG. 3, and both the search and registration processes are shown.

In FIG. 5, the process proceeds to step S13 when a frame header is received in step S11. In step S13, the destination MAC address is extracted from the frame header, and the process proceeds to step S15. In step S15, a hash value H1 is determined using the extracted destination MAC address as an entry datum to a hash function, and the process proceeds to step S17. In step S17, the memory pointer table is referred to using the calculated hash value H1 as an index. In step S19, it is determined whether or not a pointer is written in the address H1 in the memory pointer table, and if a pointer is found, then the process proceeds to step S21, and if not, then it proceeds to step S23.

In step S21, all memory banks in the MAC address table are referred to based on the memory address P1 indicated by the pointer, and MAC addresses stored at the addresses P1 are read from 8 memory banks and the process proceeds to step S25. In step S25, the read 8 MAC addresses are simultaneously compared with a destination MAC address that is separately provided, or that is inputted to the hash operation means, by parallel processing, and the process proceeds to step S27. In step S27, if a matched datum is found in the comparisons in step S25, then the process proceeds to S29, and if no matched datum is found, then it proceeds to step S23. In step S29, the MAC address and its port address are outputted and the flow ends.

If the process proceeds to step S23 from either step S19 or S27, a signal is outputted indicating the absence of a matched datum in step S23, and the process proceeds to step S31. In step S31, a hash value is determined for the source MAC address transmitted along with the destination MAC address, and the process proceeds to step S33. In step S33, the hash value determined in step S31 is used to search the source MAC address in the MAC address table, and if a matched datum is detected, the process proceeds to step S37, and if not, the process to step S35.

The search process in the step S33 is intended to include the similar comparisons to those in the step S25. This means that 8 MAC addresses read at the corresponding addresses in the MAC entry table memory 24 are simultaneously compared with source MAC addresses to be registered by parallel processing for performing a search operation. In step S35, the source MAC address and the associated data are registered with an available address (unused address) in the MAC address table, and then a pointer is written in the memory pointer table to end the flow.

In step S37, if aging process is required, the process proceeds to step S39, and if not, the flow ends. In step S39, the aging timer is reset to end the flow.

What happens when no address is available in the MAC entry table memory 24 will be described below. Additionally, the new registration process in the flow from step S23 to step S35 may be performed separately from the search process.

How a datum is added if no unused address is available in the MAC entry table memory 24 will now be described.

FIG. 6 illustrates how entry data are allocated if no unused address is available in the MAC entry table memory. In the example shown in FIG. 6, if no unused address is available for storing a new entry datum, the MAC address datum is allocated to an unused memory bank, if any, among used addresses in the MAC entry table memory. Three pointers corresponding three hash values different from each other, as shown in FIG. 6, can be used to refer to the same addresses in the MAC address table.

In FIG. 6, H11 denotes a hash value calculated by entering Entry Data 1 to a hash function. Assume that the corresponding pointer has a value P11. Similarly, H12 and H13 denote hash of Entry Data 2 and 3, respectively, and assume that values of the corresponding pointers are P12 and P13, respectively. Assume that the three hash values above have different values from each other.

When the address P11 already has Entry Data 1 stored in the MAC address entry table, and no address is available in the MAC entry table memory, entering the Entry Data 2 sets a pointer value P12 corresponding to a hash value H12 thereof to the same value of, for example, P11 described above, and entering the Entry Data 3 similarly sets a pointer value P13 corresponding to a hash value H13 thereof to the same value of, for example, P11 described above. Multiple MAC address that are different in their hash values from each other are thus stored at the same addresses in multiple memory banks in the MAC entry table memory. More entry data can therefore be stored in a MAC entry table memory with the same capacity, or alternatively, a MAC entry table memory capable of storing the predetermined number of entry data can be composed of a memory with a relatively less capacity.

As described above, by referring to a memory pointer table using hash values as index, addresses in a MAC entry table memory indicated by the pointer will indicate their respective addresses in 8 memory banks, providing for simultaneous accesses to 8 data by using a single pointer.

FIG. 7 is a block diagram illustrating an example of a comparison means for simultaneously comparing 8 entries. As shown in FIG. 7, a MAC address received from an I/O device is stored in a register 51, and data are simultaneously read from 8 memory banks. Entry Data 1 to 8 denote MAC address data read at the same addresses of memory bank addresses "000" to "111", respectively, in the MAC entry table memory 24. The same addresses are those memory addresses given by a pointer in a memory pointer table. The Entry Data 1 to Entry Data 8 are inputted to comparator circuit 1 to comparator circuit 8 that constitute the comparison means 25, respectively. MAC address read from the register 51 is inputted to all comparators from 1 to 8. The comparator circuit 1, for example, simultaneously compares a 48-bit MAC address from the register 51 with a 48-bit Entry Data 1 on a per bit basis, determines whether or not all bits in the two data are matched with each other, and if all bits thereof are matched while at the same time Exist bit is set to ON, a one is outputted to AND 1. Otherwise, a one is outputted to AND 9.

FIG. 8 illustrates a particular circuit of each comparator circuit in FIG. 7. As shown in FIG. 8, each comparator circuit is composed of 48 XNOR circuits, a 48-input AND circuit (AND 11), a 2-input AND circuit (AND 12), and an inverter circuit, in order to simultaneously compare 48-bit data and output results of the comparisons. In FIG. 8, only one of 48 XNOR circuits are depicted. The AND 11 ANDs 48 outputs of the XNOR. The 48 XNOR circuits simultaneously compares 48 bits of output from the register 51 with 48 bits of the read MAC address, and 48 results of the comparisons are provided to the AND 12. The AND 12 ANDs the output from the AND 11 with the Exist bit. As a result, if the two data are matched and the Exist bit is set to ON, the AND 12 outputs a one, and otherwise, the AND 12 outputs a zero. The inverter outputs the inverted values.

In FIG. 7, data are simultaneously compared by parallel processing in the comparator circuits 1 to 8. Although the illustration is simplified, the actual AND circuit arrangement of the AND 1 to 8 is provided with the number of AND circuits corresponding to the bit width of the entry data. Then, the AND 1, for example, ANDs one of outputs of the comparator circuit 1 with the Exist bit of the Entry Data 1, and sends the result to the output stage. The AND 2 to 8 operates in the same way as the AND 1. As a result, a 8-bit datum indicating whether or not each of the Entry Data 1 to 8 is matched with the datum in the register 51 is outputted from the output stage. If any datum of 8 data is the matched datum, a memory bank storing the datum can be identified, and data associated the matched datum are read and outputted from the MAC address table, as required. If all the Entry Data 1 to 8 are not matched with the datum in the register 51, AND 9 returns a signal indicating "not equal." According to the circuit shown in FIG. 7, 8 data having the same memory address can simultaneously be read and compared, so that all comparisons of 8 data can be completed in one memory cycle period. According to a search method of the invention, therefore, only two memory accesses are required for the search; one for each memory pointer table and MAC address table, completing the comparison and search operations only in two memory accesses. In addition, the memory pointer table and MAC address table can be placed in different memory banks, enabling pipeline processing. In this case, a search operation in a MAC address table holding multiple MAC addresses can substantially achieved only in one memory cycle.

FIG. 9 is a conceptual diagram illustrating a fixed length data search device according to a third example of the invention. In a fixed length data search device 30 shown in FIG. 9, the pointer selector table is a table of 64k' 1 bit in size, and selects one of two memory pointer tables as described below. The memory pointer tables include a main memory pointer table and subordinate memory pointer table. The MAC entry table memory 24 and comparison means 25 are identical to those shown in FIG. 3.

The main memory pointer table retains a memory address at which each MAC address is stored using a first hash value determined by a first hash function as the index. The subordinate memory pointer table retains a memory address at which each MAC address is stored using a second hash value determined by a second hash function as the index. The main memory pointer table and subordinate memory pointer table are stored in the pointer table memory. To search a MAC address, the aforementioned pointer selector table, two memory pointer tables, and the MAC address table may be stored in separate or may be stored in a single memory.

In the third example, two hash functions are used to generate two different memory pointer tables, and pointers in these memory pointer tables are used to specify an address of a MAC address table at which the MAC address is stored. Here, the hash functions are not specific but arbitrary ones.

When a MAC address is received, a first hash value of the entered MAC address is first determined by a first hash function. This determines a 16-bit hash value. The pointer selector table is then referred to using the calculated 16-bit hash value as an index. If one bit in the table points to "Primary P," then an address of the MAC address table at which the MAC address is stored is identified by referring to the main memory pointer table using the hash value as the index.

If it is found that one bit in the pointer selector table points to "Secondary S" as a result of referring to the pointer selector table using the calculated hash value as an index, the following the following processing is performed: A second hash function different from the first hash function is used to determine another 16-bit hash value (second hash value). The calculated second hash value is then used as an index to refer to the subordinate memory pointer table, and an address of the MAC address table at which the MAC address is stored is determined from a value of the pointer.

The value of one bit in the pointer selector table shows P of "Primary." If the number of hash values with the same address among hash values generated by the first hash function, however, exceeds N numbers of banks, the one bit of the pointer selector table is changed to indicate S of "Secondary." A second hash value is then calculated using the second hash function for multiple MAC addresses with a first hash value that is the same as the current first hash value, and the subordinate memory pointer table is referred to using the hash value as an index.

Specifically, 8 MAC addresses (1 to 8), for example, are registered with the MAC address table, and they all have hash values H3 determined by the first hash function. When another MAC address (9) is inputted and acquires the first hash value of the MAC address (9) that is the same as the hash value H3, a value corresponding to the hash value H3 in the pointer selector table is changed from "Primary" to "Secondary." The second hash values of MAC addresses (1 to 8) and the MAC address (9) are then calculated by the second hash function. In this case, the MAC addresses (1 to 8) are less likely to have the same second hash values as that of the MAC address (9). The calculated second hash value is then used to write each of the MAC addresses (1 to 8) and the MAC address (9) in the MAC address table, and memory addresses thereof is written in the corresponding areas in the subordinate memory pointer table.

As described above, if hash values generated by the first hash function exceeds a predetermined N number and overlaps with each other, the second function is used to disperse the hash values. The main memory pointer table is thus used when the number of MAC addresses with the same first hash value is less than or equal to a predetermined number N, and the subordinate memory pointer table is used only when it exceeds the number N. For most of MAC entries, therefore, the main memory pointer table is specified, and the subordinate memory pointer table is specified only for some MAC entries that overlaps with each other in multiple hash values, facilitating efficient use of the memory pointer table.

Second hash values of multiple MAC addresses calculated by the second hash function are less likely to be the same. A complete hash function capable of uniformly disperse hash values, however, does not exist, and the hash values may possibly to be the same. In this case, multiple entries with the same second hash value are registered with different memory in the MAC entry table memory 24. Eight MAC entries with the same hash value, therefore, may be accepted in this example.

In another case, no unused address may be available in the MAC entry table memory 24 when an attempt is made to add a MAC address to the MAC address table after the first hash value has been determined by the first hash function. In this case, the MAC address is registered with an unused memory bank among used addresses. In this case, MAC addresses with different hash values may be registered with each memory bank with the same memory address, facilitating efficient use of the limited memory addresses.

To search a MAC address, the first hash value of the inputted MAC address is determined by the first hash function, the pointer selector table is referred to using the first hash value as the index, and either the main memory pointer table or subordinate memory pointer table is referred to depending on "Primary" or "Secondary" indicated by the 1-bit datum to obtain an address to be read in the MAC entry table memory. Eight data stored at the address are simultaneously read, and the inputted MAC address is simultaneously compared with each of the read 8 data in the comparison means 25 and the result of the comparison is outputted.

FIG. 10 is a flow chart illustrating a MAC address search process according to the third example of the invention. The process shown in FIG. 10 is performed when an entry datum is inputted to a MAC address search device 30. In FIG. 10, the process proceeds to step S53 when a frame header is received in step S51. In step S53, the destination MAC address is extracted from the frame header, and the process proceeds to step S55. In step 55, a first hash value H10 of the destination MAC address is determined by a first hash function, and the process proceeds to step S57. In step S57, the pointer selector table is referred to using the hash value as the index, and if the value points to P (Primary), the process proceeds to step S59, and if S (Secondary) is pointed, it proceeds to step S67. The initial value of the pointer is P.

In step S59, the main memory pointer table is referred to using the first hash value H10 as the index, and if a pointer exists, the process proceeds to step S61, and if not, it proceeds to step S73. In step S61, the MAC address table is searched for a datum that matches with the inputted destination MAC address based on the pointer, and in step S63, if a matched datum is found, the process proceeds to step S65, and if not, it proceeds to step S73. The search process in step S61 is intended to include the similar comparisons to those in step S25 shown in FIG. 5, and they will not be described here.

In step S65, a port address corresponding to the matched data, or MAC address, is read from the MAC address table, and it is outputted along with the MAC address to end the flow. If the process proceeds from step S59 to step S73, a signal indicating the "absence of a matched datum" in step S73. Once the step S73 is processed, the flow ends, or alternatively, the process proceeds to the registration of the source MAC address transmitted along with the destination MAC address for which no matched datum has been found. The registration of the source MAC address process will be described below.

If the process proceeds from step S57 to step S67, a second hash value H20 of the inputted MAC address is determined by the second hash function, and the process proceeds to step S69. In step S69, the subordinate memory pointer table is referred to using the second hash value H20 as the index, and based on the pointer, the MAC address table is searched for a datum that matches with the inputted destination MAC address. In step S71, if a matched datum is found, the process proceeds to step S65, and if not, it proceeds to step S73.

FIG. 12 is a flow chart illustrating a MAC address process according to the third example of the invention. The MAC address registration shown in FIG. 12 may be performed after the step S73 shown in FIG. 10, or may be performed independent of the search process.

In FIG. 12, the source MAC address is extracted from the frame header in step S153, and the process proceeds to step S155. In step 155, a first hash value of the source MAC address is determined by a first hash function, and the process proceeds to step S157. In step S157, the pointer selector table is referred to using the hash value as the index, and if the value points to P (Primary), the process proceeds to step S159, and if S (Secondary) is pointed, it proceeds to step S167. The initial value of the pointer is P.

In step S159, the main memory pointer table is referred to using the first hash value as the index, and if a pointer exists, the process proceeds to step S161, and if not, it proceeds to step S177. In step S161, the MAC address table is searched for a datum that matches with the inputted source MAC address based on the pointer. The search process in step S161 is similar to those in step S33 as described in detail in the second example, and 8 MAC addresses read at the corresponding address in the MAC entry table memory 24 are simultaneously compared with the source MAC address to be registered by parallel processing for performing a search operation. In step S163, if a matched datum is found, the process proceeds to step S164, and if not, it proceeds to step S179.

In step S164, if aging process is required, the process proceeds to step S165, and if not, the flow ends. In step S165, the aging timer is reset to end the flow.

If the process proceeds from step S159 to step S177, the inputted source MAC address and the associated data are registered with the main memory pointer table and the MAC address table to end the flow. In the registration process in the step S177, any unused address in the MAC entry table memory the unused address is used for the registration. If no unused address is available, a memory bank already in use among used addresses is used for the registration. In this case, multiple data with different hash values may be stored at the same memory address.

If the process proceeds from step S163 to step S179, whether or not an available bank (unused bank) exist is examined in step S179, and the process proceeds to step S181 if any bank is available, and if not, it proceeds to step S183. In step S181, the source MAC address to be registered and the associated data are registered with the available bank in the memory address, and the flow ends. In step S183, second hash values are determined by the second hash function for multiple data with the same first hash value(synonym data), and based on the second hash values, they are registered with the subordinate memory pointer table and the MAC address table.

Among the multiple synonym data, multiple data already registered with the main memory pointer table are removed from the main memory pointer table. In addition, if there are multiple number of MAC addresses with the same second hash value, these data are stored at the same addresses in different memory banks in the MAC entry table memory. In step S185, the pointer in the pointer selector table is changed from P to S, and the flow ends.

If the process proceeds from step S157 to step S167, the second hash value H20 of the inputted source MAC address is determined by the second hash function, and the process proceeds to step S169. In step S169, the subordinate memory pointer table is referred to using the second hash value H20 as the index, and based on the pointer, the MAC address table is searched for a datum that matches with the inputted source MAC address. In step S171, if a matched datum is found, the process proceeds to step S164, and if not, it proceeds to step S175.

In step S175, the inputted source MAC address is registered the subordinate memory pointer table and the MAC address table to end the flow. If multiple MAC addresses with the same second hash value exist in the process in the step S177, they are stored at the same addresses in different memory banks in the MAC entry table memory 24.

As described in detail in the second example, the third example may also facilitate efficient use of the MAC entry table memory, and the size of the MAC entry table memory 24 may be reduced because a single memory address in the MAC entry table memory 24 can be referred to through different pointers. Additionally, a MAC address can be searched in a very short time because multiple MAC addresses read at the same addresses in multiple memory banks are simultaneously compared by parallel processing.

The time required to perform a search operation in the third example increases by one memory cycle compared to the second example. The MAC address table that retains a large number of MAC address may, however, require 2 or 3 memory cycles to perform a search operation; it can be performed in a short time.

As described in detail above, embodiments according to the present invention enables a search operation to rapidly be performed in a data table storing a large number of fixed length data on the order of 1 to 3 memory cycles. In addition, a device and method of the invention for searching fixed length data may be applied to searching and registering of MAC addresses often used in network communications, as described above with reference to the examples. The present invention may also be applied to a computer program for functioning a computer as an information processing device that adopts a device and method for searching fixed length data according to the invention. In addition, the present invention may also be applied to a computer readable recording medium that stores the above computer program.

FIG. 13 is a block diagram illustrating an exemplary configuration of hardware applicable to a computer program and computer readable recording medium according to the invention.

In FIG. 13, a computer system 70 includes a CPU 53, a storage device 55, and an input/output device 57, connected to a system bus 51. The central processing unit (CPU) 53 comprises at least an arithmetic unit and a control unit, and the storage device 55 is composed of, for example, an internal main storage memory, a hard disk drive, or floppy disk drive. When a computer program according to the invention is installed in the computer system 70, it is stored in the hard disk drive and is loaded into the main storage memory as required. The main storage memory in the storage device 55 or a cache memory included in the CPU 53 may constitute a pointer table memory and data table memory, etc. according to the invention. The input/output device 57 can include multiple input/output ports to externally communicate data. In the storage device 55, for example, the hard disk drive or floppy disk drive can read the program from a recording medium according to the invention in which the computer is recorded.

The invention claimed is:

1. A fixed length data search device, comprising:
a hash operation means for applying first and second similarly constructed hash function and thereby outputting multiple entry data corresponding to respective first and second hash values of an inputted fixed length datum;
a data table memory consisting of N numbers of memory banks, where N is an integer greater than or equal to two, the data table memory capable of storing a data table holding a large number of fixed length data;
a pointer table memory for storing a main memory pointer table, which is associated with the first hash function, and a subordinate memory pointer table for use when the main memory pointer table is filled to a predetermined level with respect to the N numbers of memory banks, which is associated with the second hash function that each indicates a memory address in said data table memory at which each fixed length datum is stored in said data table memory with said first and second hash values each acting as a respective index therefore;
a pointer selector table to indicate which one of said main and subordinate memory pointer tables is referred to when a fixed length datum is inputted, wherein a datum identical to the single fixed length datum inputted to said hash operation means is searched in said data table through said hash operation means, said single fixed length datum registered in said data table if the datum has not been previously registered with said data table, and wherein if another fixed length datum having the same first hash value as an inputted fixed length datum has not been registered with said data table, said inputted fixed length datum is stored in said data table memory, and said memory address at which the datum is stored is managed with said main memory pointer table: and
a comparison means for simultaneously comparing a plurality of fixed length data stored at the same memory address in said N numbers of memory banks, the comparison means for outputting results of the comparison.

2. The fixed length data search device according to claim 1, wherein said comparison means comprises N numbers of comparators for determining if two fixed length data are identical, the device referring to said memory pointer table based on a resulting memory address, said comparison means determining if any of the fixed length data stored at the same memory address in said N numbers of memory banks matches the single fixed length datum inputted to said hash operation means, said comparison means outputting the result of the determination.

3. The fixed length data search device according to claim 1, wherein each of a plurality of fixed length data having the same hash value are stored at the same memory address of a different memory bank in said data table memory.

4. The fixed length data search device according to claim 1, wherein each of a plurality of fixed length data having a different hash value are stored at the same memory address of a different memory bank in said data table memory.

5. The fixed length data search device according to claim 1, wherein said fixed length data is a MAC (Media Access Control) address for network communications, and said data table memory is a MAC entry table memory for storing a MAC address table holding a large number of MAC addresses.

6. A fixed length data search device, comprising:
a hash operation means, said hash operation means using two types of similarly constructed hash functions to determine a first and second hash values of an inputted fixed length datum wherein said first and second hash values include multiple entry data;
a data table memory consisting of N numbers of memory banks, where N is an integer that is greater than or equal to two, the data table memory for storing a data table holding a large number of fixed length data;
a pointer table memory for storing a first memory pointer table, said pointer table memory that indicates a memory address in said data table memory at which each fixed length datum is stored in said data table memory wherein said first hash value is an index, and a second memory pointer table for use when the first memory pointer table is determined to be filled to a predetermined level with respect to the N numbers of memory banks, which is associated with the second hash function, holding the memory address in said data table memory at which each fixed length datum is stored in said data table memory, said second hash value as an index;

a pointer selector table using said first hash value as an index to indicate which one of said first and second memory pointer tables is referred to when a fixed length datum is inputted, wherein when the number of stored data of separate fixed length data having the same first hash value exceeds N, a pointer in said pointer selector table corresponding to the first hash value of an unstored fixed length datum stored is set to said second memory pointer table, said memory address at which the datum is stored managed with said second memory pointer table, wherein if another fixed length datum having the same first hash value as an inputted fixed length datum has not been registered with said data table, said inputted fixed length datum is stored in said data table memory, and said memory address at which the datum is stored is managed with said main memory pointer table: and a comparison means for simultaneously comparing a plurality of fixed length data stored at the same memory address in said N numbers of memory banks, the comparison means for outputting results of the comparison.

7. The fixed length data search device according to claim 6, wherein said comparison means comprises N numbers of comparators, said comparators simultaneously compare all bits to determine whether or not two fixed length data are identical.

8. The fixed length data search device according to claim 6, wherein said comparison means determines if any of the fixed length data stored at the same memory address in said N numbers of memory banks matches the single fixed length datum inputted to said hash operation means and outputs the result of the determination.

9. The fixed length data search device according to claim 6, wherein said fixed length data is a MAC (Media Access Control) address for network communications, and said data table memory is a MAC entry table memory for storing a MAC address table holding a large number of MAC addresses.

10. A method of searching fixed length data, comprising the steps of:

performing first and second similarly constructed hash operations to thereby outputting respective first and second hash values of inputted fixed length data, wherein each of said hash values includes multiple entry data;

referring to a main memory pointer table, which is associated with the first hash operation, or a subordinate memory pointer table for use when the main memory pointer table is filled to a predetermined level with respect to N numbers of memory banks, which is associated with the second hash function, which is associated with the second hash operations, each of which holds a memory address in a data table memory at which each fixed length datum is stored in said data table memory with said first and second hash values each acting as a respective index therefor;

reading N numbers of fixed length data stored at an address pointed to by a pointer in said memory pointer table from a data table stored in said data table memory consisting of N numbers of memory banks, where N is an integer that is greater than or equal to two, the data table capable of storing a large number of fixed length data, indicating in a pointer selector table which one of said main and subordinate memory pointer tables is referred to when a fixed length datum is inputted:

searching an identical datum to said inputted single fixed length datum in said data table based on its hash value, and registering said inputted single fixed length datum in said data table if said identical datum has not been detected in said step of search mg;

detecting an exist bit associated with said data table into which the inputted single fixed length datum is to be registered;

determining if the exist bit indicates an on-state or an off-state of said data table, when the exist bit indicates the on-state, proceeding with the registering, when the exist bit indicates the off-state, proceeding with the second hash operation, and indicating that a next registered single fixed length datum is to be registered in the subordinate memory pointer table; and simultaneously comparing said read N numbers of fixed length data with said inputted single fixed length datum, and outputting results of the comparison.

11. The method of searching fixed length data according to claim 10, wherein said step of comparing comprises simultaneously comparing said read N numbers of fixed length data using parallel processing, said comparing determining if two fixed length data are identical.

12. The method of searching fixed length data according to claim 10, wherein each of separate fixed length data having the same hash value is registered with the same memory address of a different memory bank in said data table memory during said registering.

13. The method of searching fixed length data according to claim 12, wherein each of a plurality of fixed length data having a different hash value is registered with the same memory address of a different memory bank in said data table memory.

* * * * *